(12) United States Patent
Vanska et al.

(10) Patent No.: US 9,614,981 B2
(45) Date of Patent: Apr. 4, 2017

(54) DEFORMABLE APPARATUS, METHOD AND COMPUTER PROGRAM

(75) Inventors: Anssi Vanska, Helsinki (FI); Matti Kosonen, Jarvenpaa (FI)

(73) Assignee: Nokia Technologies Oy, Espoo (FI)

( * ) Notice: Subject to any disclaimer, the term of this patent is extended or adjusted under 35 U.S.C. 154(b) by 689 days.

(21) Appl. No.: 13/362,121

(22) Filed: Jan. 31, 2012

(65) Prior Publication Data

US 2013/0197819 A1    Aug. 1, 2013

(51) Int. Cl.
*H04M 19/04* (2006.01)
*G06F 1/16* (2006.01)
*G06F 3/01* (2006.01)

(52) U.S. Cl.
CPC .......... *H04M 19/04* (2013.01); *G06F 1/1652* (2013.01); *G06F 3/016* (2013.01)

(58) Field of Classification Search
CPC .............................. G06F 1/1652; G06F 3/016
USPC ......................................................... 702/33
See application file for complete search history.

(56) References Cited

U.S. PATENT DOCUMENTS

| 2009/0189749 A1 | 7/2009 | Salada ........................ 340/407.2 |
| 2010/0162109 A1 | 6/2010 | Chatterjee et al. ............ 715/702 |
| 2010/0283727 A1* | 11/2010 | Jiang et al. ................... 345/156 |
| 2011/0075835 A1 | 3/2011 | Hill | |

FOREIGN PATENT DOCUMENTS

| EP | 1 574 934 A1 | 9/2005 |
| EP | 2315186 A2 | 4/2011 |
| JP | 2006/333124 A | 12/2006 |
| KR | 10-2009-0125876 | 12/2009 |
| WO | WO-2011/107195 A1 | 9/2011 |
| WO | WO 2011/135171 A1 | 11/2011 |

OTHER PUBLICATIONS

Zhai, S., et al., "Human Performance Evaluation of Manipulation Schemes in Virtual Environments", Sep. 1993, Proceedings of IEEE Virtual Reality Annual International Symposium (VRAIS), Seattle, WA, 8 pgs.

Scott, J., et al., "Mobile Device Interaction with Force Sensing", © 2009 Springer-Verlag Berlin Heidelberg, pp. 133-150.

* cited by examiner

*Primary Examiner* — Manuel Rivera Vargas
(74) *Attorney, Agent, or Firm* — Harrington & Smith

(57) ABSTRACT

An apparatus, method and computer program, the apparatus including at least one processor; and at least one memory including computer program code; wherein the at least one memory and the computer program code are configured to, with the at least one processor, enable the apparatus to: obtain an input signal indicative of a deformation of a housing of the apparatus; and provide, in response to the obtained input signal, an output signal to control further deformation of the housing of the apparatus.

18 Claims, 5 Drawing Sheets or DEFORMABLE APPARATUS, METHOD AND COMPUTER PROGRAM

TECHNOLOGICAL FIELD

Embodiments of the present invention relate to a deformable apparatus, method and computer program. In particular, they relate to a deformable apparatus, method and computer program where the apparatus may be configured to deform automatically.

BACKGROUND

Deformable apparatus, such as hand portable electronic communication devices, which may be bent or stretched in response to a user input are known. It may be beneficial to enable such deformable apparatus to be deformed automatically without any direct user input.

BRIEF SUMMARY

According to various, but not necessarily all, embodiments of the disclosure there is provided an apparatus comprising: at least one processor; and at least one memory including computer program code; wherein the at least one memory and the computer program code are configured to, with the at least one processor, enable the apparatus to: obtain an input signal indicative of a deformation of a housing of the apparatus; and provide, in response to the obtained input signal, an output signal to control further deformation of the housing of the apparatus.

In some embodiments the housing may comprise an external casing of the apparatus.

In some embodiments the housing may house the at least one processor and the at least one memory.

In some embodiments the input signal indicative of the deformation of the housing of the apparatus may be obtained from one or more sensors configured to detect the deformation of the housing.

In some embodiments the processor may also be configured to receive an input signal indicative of the occurrence of an event and in response to the input signal provide an output signal which causes the housing of the apparatus to be deformed. The input signal may determine the deformation of the housing of the apparatus.

In some embodiments the apparatus may comprise an actuator configured to receive a control signal from the at least one processor and control the deformation of the housing of the apparatus in response to the control signal.

In some embodiments the deformation may comprise bending at least a portion of the housing of the apparatus.

In some embodiments the deformation may comprise stretching at least a portion of the housing of the apparatus.

In some embodiments the deformation may comprise changing the shape of at least a portion of the housing of the apparatus.

According to various, but not necessarily all, embodiments of the disclosure there is provided a method comprising: obtaining an input signal indicative of a deformation of a housing of an apparatus; and providing, in response to the obtained input signal, an output signal to control further deformation of the housing of the apparatus.

In some embodiments the housing may comprise an external casing of the apparatus.

In some embodiments the housing may house at least one processor and at least one memory configured to enable the method to be carried out.

In some embodiments the input signal indicative of the deformation of the housing of the apparatus may be obtained from one or more sensors configured to detect the deformation of the housing.

In some embodiments the method may further comprise receiving an input signal indicative of the occurrence of an event and in response to the input signal providing an output signal which causes the housing of the apparatus to be deformed. The input signal may determine the deformation of the housing of the apparatus.

In some embodiments the output signal to control the deformation of the housing of the apparatus may be provided to an actuator configured to control the deformation of the housing of the apparatus in response to the control signal.

In some embodiments the deformation may comprise bending at least a portion of the housing of the apparatus.

In some embodiments the deformation may comprise stretching at least a portion of the housing of the apparatus.

In some embodiments the deformation may comprise changing the shape of at least a portion of the housing of the apparatus.

According to various, but not necessarily all, embodiments of the disclosure there is provided a computer program comprising computer program instructions that, when executed by at least one processor, enable an apparatus at least to perform: obtaining an input signal indicative of a deformation of a housing of an apparatus; and providing, in response to the obtained input signal, an output signal to control further deformation of the housing of the apparatus.

In some embodiments there may also be provided a computer program comprising program instructions for causing a computer to perform a method as described above.

In some embodiments there may also be provided a physical entity embodying the computer program as described above.

In some embodiments there may also be provided an electromagnetic carrier signal carrying the computer program as described above.

The apparatus may be for wireless communication.

BRIEF DESCRIPTION

For a better understanding of various examples of embodiments of the present disclosure reference will now be made by way of example only to the accompanying drawings in which:

FIG. 1 schematically illustrates an apparatus according to an examplary embodiment of the disclosure;

DETAILED DESCRIPTION

Figure 1:
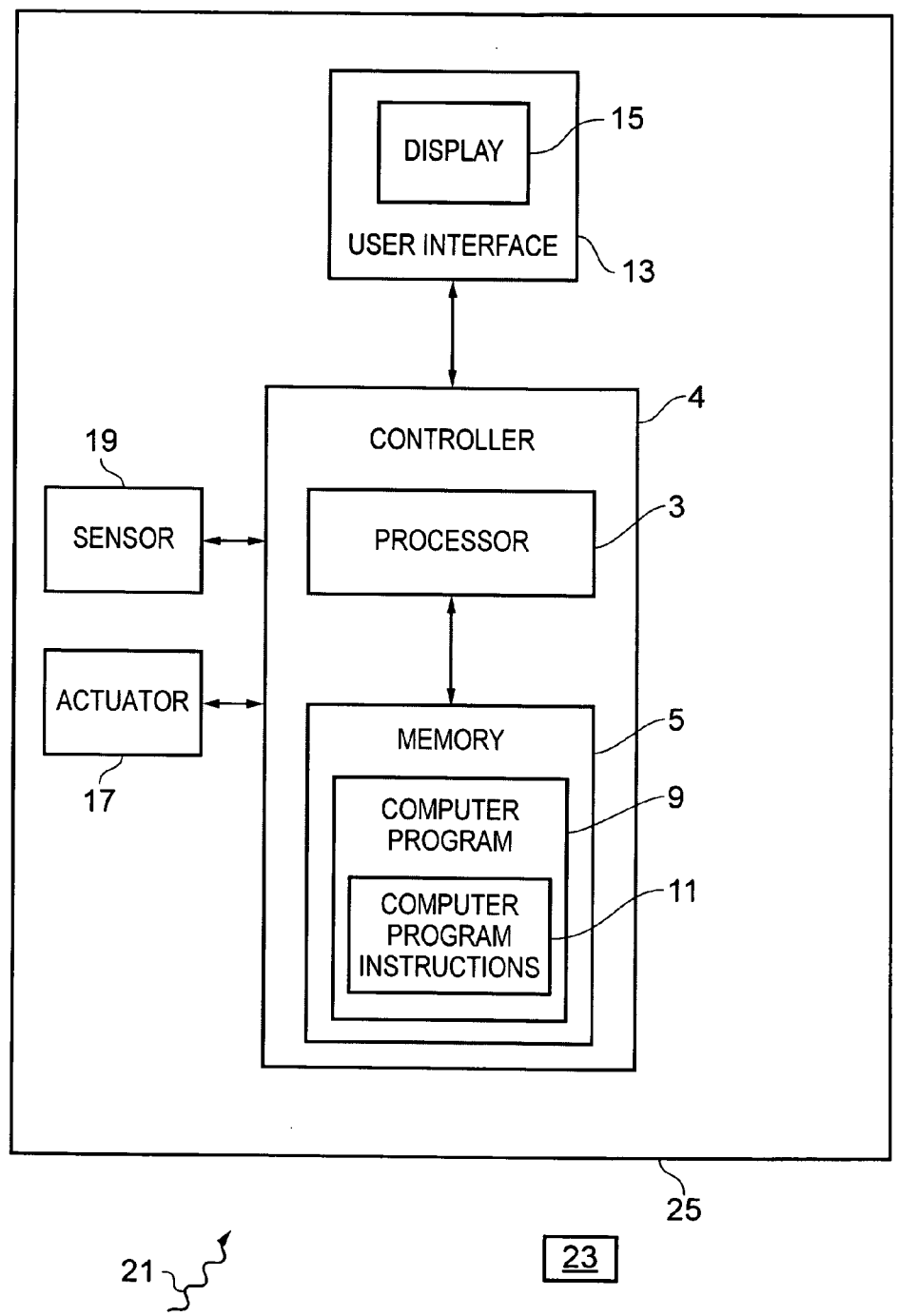

The Figures illustrate an apparatus 1, method and computer program 9, the apparatus 1 comprising: at least one processor 3; and at least one memory 5 including computer program code; wherein the at least one memory 5 and the computer program code are configured to, with the at least one processor 3, enable the apparatus 1 to: obtain an input signal 39 indicative of a deformation 37 of a housing 25 of the apparatus 1; and provide, in response to the obtained input signal 39, an output signal 33 to control further deformation of the housing 25 of the apparatus 1.

FIG. 1 schematically illustrates an apparatus 1 according to an exemplary embodiment of the disclosure. The apparatus 1 may be an electronic apparatus. The apparatus 1 may be, for example, a mobile cellular telephone, a personal computer, a camera, a gaming device, a personal digital assistant, an electronic book reader, a personal music player or any other suitable apparatus. The apparatus 1 may be a handheld apparatus 1 which can be carried in a user's hand, handbag or pocket of their clothing for example.

The examplary apparatus 1 illustrated in FIG. 1 comprises: a user interface 13, at least one sensor 19, at least one actuator 17 and a controller 4. In the illustrated embodiment the controller 4 comprises at least one processor 3 and at least one memory 5 and the user interface 13 comprises a display 15. In the examplary embodiment of FIG. 1 the controller 4, user interface 13, at least one sensor 19 and at least one actuator 17 are housed within a housing 25.

Only features referred to in the following description are illustrated in FIG. 1. However, it should be appreciated that the apparatus 1 may comprise additional features that are not illustrated. For example, in embodiments of the disclosure where the apparatus 1 is a mobile cellular telephone or other communications device, the apparatus 1 may also comprise a transmitter and receiver configured to enable wireless communication.

The controller 4 may provide means for controlling the apparatus 1. The controller 4 may be implemented using instructions that enable hardware functionality, for example, by using executable computer program instructions 11 in one or more general-purpose or special-purpose processors 3 that may be stored on a computer readable storage medium 23 (e.g. disk, memory etc) to be executed by such processors 3.

The controller 4 may be configured to control the apparatus 1 to perform a plurality of different functions. For example, where the apparatus 1 is a mobile cellular telephone the controller 4 may be configured to control the apparatus 1 to make and receive telephone calls and also to perform other functions such as send and receive messages or access communication networks such as local area networks or the internet.

The controller 4 may also be configured to enable the apparatus 1 to obtain an input signal indicative of a deformation of a housing 25 of an apparatus 1; and provide, in response to the obtained input signal, an output signal to control further deformation of the housing 25 of the apparatus 1.

The at least one processor 3 may be configured to receive input commands from the user interface 13 and the at least one sensor 19. The at least one processor 3 may also be configured to provide output commands to the user interface 13 and the at least one actuator 17. The at least one processor 3 is also configured to write to and read from the at least one memory 5.

The at least one memory 5 stores a computer program code 9 comprising computer program instructions 11 that control the operation of the apparatus 1 when loaded into the at least one processor 3. The computer program instructions 11 provide the logic and routines that enable the apparatus 1 to perform the methods illustrated in FIGS. 3 and 4 which are described below. The at least one processor 3 by reading the at least one memory 5 is able to load and execute the computer program 9.

The computer program instructions 11 may provide computer readable program means configured to control the apparatus 1. The program instructions 11 may provide, when loaded into the controller 4; means for obtaining an input signal indicative of a deformation of a housing 25 of an apparatus 1; and providing, in response to the obtained input signal, an output signal to control further deformation of the housing 25 of the apparatus 1.

The computer program code may arrive at the apparatus 1 via any suitable delivery mechanism 21. The delivery mechanism 21 may be, for example, a computer-readable storage medium, a computer program product 23, a memory device, a record medium such as a CD-ROM or DVD, an article of manufacture that tangibly embodies the computer program code. The delivery mechanism may be a signal configured to reliably transfer the computer program code. The apparatus 1 may propagate or transmit the computer program code as a computer data signal.

Although the memory 5 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (e.g. Von Neumann)/parallel architectures but also specialized circuits such as field-programmable gate arrays (FPGA), application specific integration circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The apparatus illustrated in FIG. 1 also comprises a user interface 13. The user interface 13 may comprise any means which enables a user of the apparatus 1 to interact with the apparatus 1.

In the exemplary embodiment illustrated in FIG. 1 the user interface 13 comprises a display 15. The display 15 may comprise any means which enables information to be displayed to a user of the apparatus 1. The displayed information may correspond to information which has been input by the user via a user input device, information which is stored in the one or more memories 5 or information which has been received by apparatus 1.

The display 15 may be located within the housing 25 of the apparatus 1 so that the display 15 forms part of the outer surface of the housing 25. In some examplary embodiments of the disclosure the display 15 may be a flexible display which may be configured to deform by changing shape or size when the housing 25 of the apparatus 1 is deformed.

In some examplary embodiments of the disclosure the user interface 13 may also comprise a user input device which may comprise any means which enables a user of the apparatus 1 to input information into the apparatus 1. For example, the user input device may comprise a touch sensitive display 15. Information which is input via the user input device may be used to control the apparatus 1 and/or may be stored in the one or more memories 5.

The examplary apparatus 1 illustrated in FIG. 1 also comprises at least one actuator 17. The actuator 4 may be configured to receive a control signal from the controller 4. It is to be appreciated that only one actuator 17 has been illustrated in FIG. 1 but that any number of actuators 17 may be provided in different embodiments of the disclosure.

The actuators 17 may comprise any means which may be configured to deform in response to an output signal provided by the controller 4. The deformation may comprise any change in size or shape such as bending, twisting or stretching or decreasing in size. The actuators 17 may be coupled to the housing 25 so that the deformation of the actuators 17 causes the deformation of the housing 25 of the apparatus 1.

In examplary embodiments of the disclosure the one or more actuators 17 may comprise wires or other components comprising a material which changes shape in response to an electric current or change in temperature. The material may comprise a shape memory alloy such as copper-zinc-aluminum-nickel, copper-aluminum-nickel and nickel-titanium.

It is to be appreciated that any suitable means may be used as the one or more actuators 17 of the apparatus 1. In other examplary embodiments of the disclosure the one or more actuators 17 may comprise a motor or linear motor which may be configured to drive a mechanism which causes the deformation of the housing 25 of the apparatus 1. In other examplary embodiments of the disclosure the one or more actuators 17 may comprise an electroactive polymer (EAP) or any other material which may be configured to change shape when a voltage or current is applied to it.

The examplary apparatus 1 illustrated in FIG. 1 also comprises at least one sensor 19. It is to be appreciated that only one sensor 19 has been illustrated in FIG. 1 but that any number of sensor 19 may be provided in different embodiments of the disclosure.

The sensors 19 may comprise any means which may be configured to detect deformations of the apparatus 1. The deformations may comprise a deformation of the housing 25 of the apparatus 1. The sensors 19 may be configured to detect a deformation and provide an input signal to the controller 4 indicative of the detected deformations.

In some examplary embodiments of the disclosure the one or more sensors may comprise capacitive sensors, inductive sensors, light sensors, hall sensors or any other suitable type of sensor. It is to be appreciated that in some embodiments of the disclosure a plurality of different types of sensors may be used in the same apparatus 1.

The sensors 19 may be able to distinguish between different types of deformations for example, the sensors 19 may be able to determine which portion of the housing 25 has been deformed, the type of deformation such as the change in size or shape of the housing 25 of the apparatus 1 and the magnitude of the deformation of the housing 25 of the apparatus 1 which has been detected.

The input signal which is provided by the one or more sensors 19 may be dependent upon the type of deformation which has been detected. The controller 4 may be configured to control the further deformation of the housing 25 of the apparatus 1 in dependence upon the deformation detected by the one or more sensors 19.

The apparatus 1 illustrated in FIG. 1 also comprises a housing 25. The housing 25 provides an external casing for the apparatus 1. The components of the apparatus 1, which are illustrated schematically in FIG. 1 may be contained within the housing 25. Some of the components of the apparatus 1, such as the display 15 may be provided on the surface of the housing 25. The housing 25 may provide protection for the components of the apparatus 1. For example, the housing 25 may protect the components of the apparatus 1 from atmospheric conditions such as moisture or temperature variations. The housing 25 may also be configured to protect the components of the apparatus 1 from mechanical shocks.

The housing 25 of the apparatus 1 may be configured to be deformed. The housing 25 may comprise one or more portions which may be configured to be deformed. In some embodiments of the disclosure the whole of the housing 25 of the apparatus 1 may be configured to be deformed. For example the housing 25 may comprise a flexible body portion. The flexible body portion may comprise a resiliently deformable material that surrounds an inner protective core. The inner protective core may house the controller 4 and other components that may be damaged if bent or deformed. The resiliently deformable material may comprise, for example, a gel or fluid in a sealed sac and/or elastomeric material.

In some embodiments the housing 25 of the apparatus 1 may comprise a plurality of hinged or jointed segments. The hinged or jointed segments may be configured to be moved with respect to each other to enable a portion of the apparatus 1 to be folded or bent or otherwise deformed.

It is to be appreciated that other types of housing 25 which may be deformed maybe used in other embodiments of the disclosure.

The one or more actuators 17 of the apparatus 1 may be coupled to the housing 25 of the apparatus 1 so that the one or more actuators 17 may cause the deformation of the housing 25 of the apparatus 1.

Figure 2:
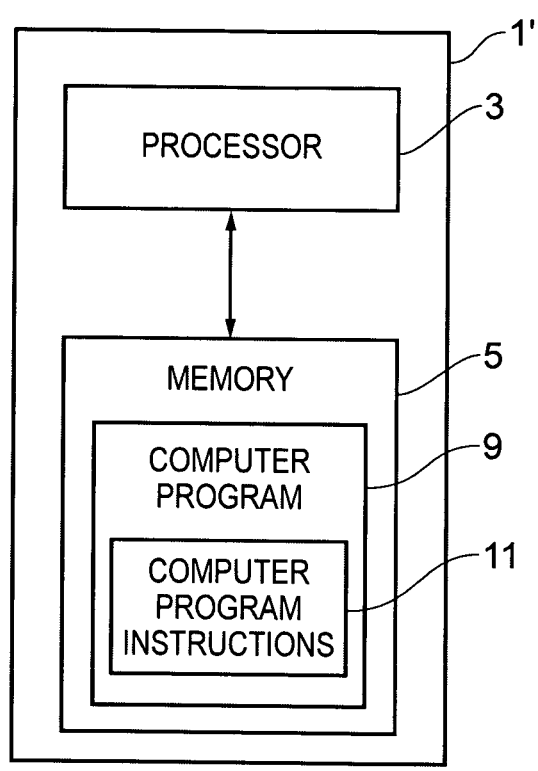
FIG. 2 illustrates an apparatus according to another embodiment of the disclosure.

FIG. 2 illustrates an apparatus 1' according to another embodiment of the disclosure. The apparatus 1' illustrated in FIG. 2 may be a chip or a chip-set. The apparatus 1' comprises at least one processor 3 and at least one memory 5 as described above in relation to FIG. 1.

Figure 3:
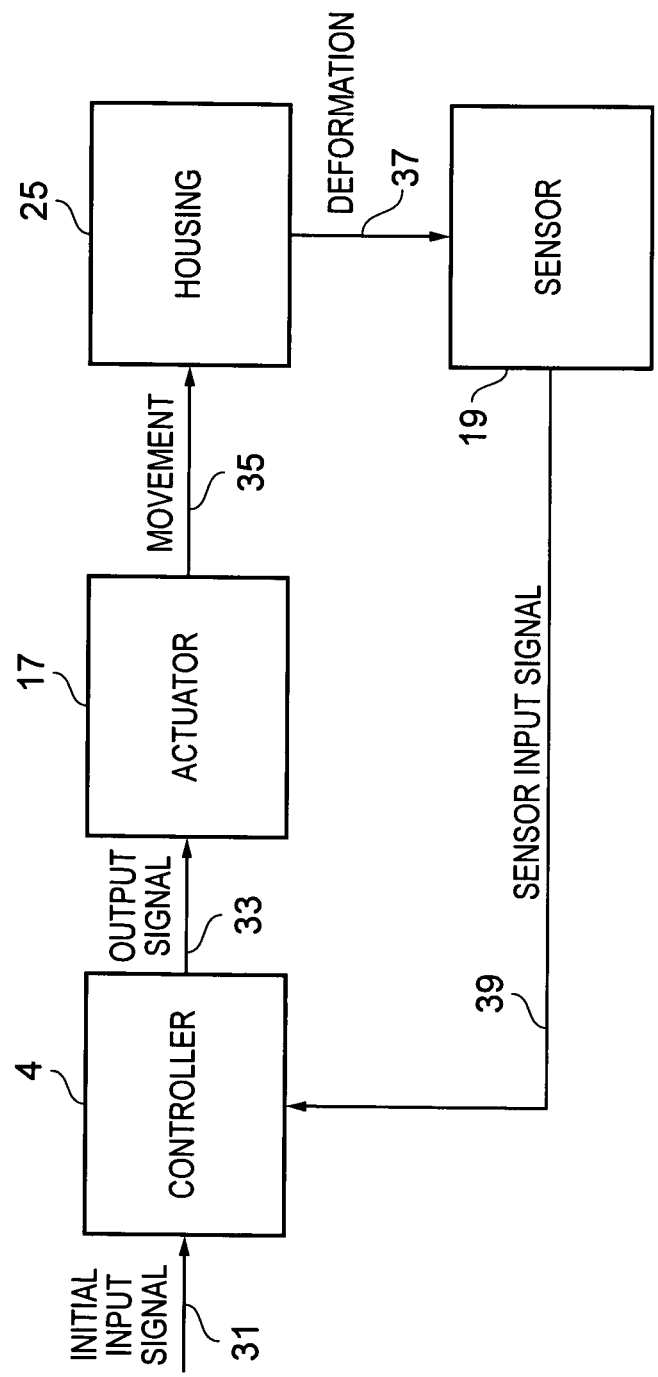
FIG. 3 is a block diagram which schematically illustrates a method according to examplary embodiments of the disclosure.

FIG. 3 is a block diagram which schematically illustrates a method according to examplary embodiments of the disclosure. The apparatus 1 illustrated in FIGS. 1 and 2 may be used to implement the method of FIG. 3.

In the method illustrated in FIG. 3 an initial input signal 31 is provided to a controller 4. The initial input signal 31 may be provided in response to the detection that an event has occurred. The initial input signal 31 may contain information indicative of the event which has occurred. In some embodiments of the disclosure the initial input signal 31 may comprise information which is indicative of a deformation of the housing 25 of the apparatus 1 which is to be provided in response to the detected event and so the initial input signal 16 may determine the deformation of the housing 25 of the apparatus 1.

The event which has occurred may comprise an event which has occurred internally within the apparatus 1. For example, in embodiments of the disclosure where the apparatus 1 is configured for communication the event which is detected may comprise an incoming call or message. In some embodiments the event may comprise a notification of an event that has occurred remotely to the apparatus 1. For example, the event may comprise a message or image being uploaded to a remote server as part of a social networking application which the apparatus 1 may be configured to access. In some embodiments the event may comprise detecting a physical condition of the apparatus 1. For example the event which has occurred may comprise the apparatus 1 being dropped or a user applying force to the apparatus 1 which exceeds a particular threshold so could potentially damage the apparatus 1.

It is to be appreciated that any event that may be detected by the apparatus 1 may be used as a trigger to provide the initial input signal 31. The events which are detected may be dependent upon the type of apparatus 1 and the modes of operation of the apparatus 1 which currently in use.

In response to receiving the initial input signal 31 the controller 4 provides an output signal 33 to control the deformation of the housing 25 of the apparatus 1. The output signal 33 provides an indication of the deformation of the housing 25 of the apparatus 1 which is to be made in response to receiving the initial input signal 31. The output signal 33 which is provided may be dependent upon the initial input signal 31 which is received by the controller 4.

The deformation may comprise any change in size or shape of the housing 25 of the apparatus 1. The deformation may be made to the whole of the housing 25 or just a portion of the housing 25 of the apparatus 1. For example, the deformation may comprise a stretching, bending or twisting of the housing 25 of the apparatus 1.

The input signal which is obtained by the controller 4 from the one or more sensors 19 may provide an indication of the type of the deformation which has been made. For example it may provide an indication of the change of shape of the housing 25. For instance, it may indicate whether the housing 25 has been stretched or bent or twisted or a combination of different deformations.

In the examplary embodiment of FIG. 3 the output signal 33 is provided to an actuator 17. As described above in relation to FIG. 1 the actuator 17 may comprise any suitable means which may be configured to change shape in response to the output signal 33 provided by the controller 4.

The output signal 33 causes movement 35 of the actuator 17. The movement 35 may comprise any suitable change in shape or size of the actuator 17. For example it may comprise a bending, twisting, shrinking or stretching or any other suitable change of shape. The type and magnitude of the change in shape of the actuator 17 may be determined by the output signal 33.

The output signal 33 may cause the actuator 17 to change shape automatically without any direct input from the user of the apparatus 1. The deformation of the housing 25 of the apparatus 1 may be caused without the user of the apparatus 1 applying any stresses or strains to the housing 25 of the apparatus 1.

As described above in relation to FIG. 1 the actuator 17 may be coupled to the housing 25 so that movement 35 of the actuator 17 causes movement of at least a portion of the housing 25 and so causes deformation 37 of the housing 25 of the apparatus 1.

As the change in shape of the actuator 17 may arise automatically without any direct input from the user of the apparatus 1 the housing 25 of the apparatus 1 may also be deformed automatically without any input from the user of the apparatus 1.

In the examplary embodiment of FIG. 3 the sensors 19 are configured to detect the deformation 37 of the housing 29 of the apparatus 1 and provide a sensor input signal 39 to the controller 4. The sensor input signal 39 is indicative of the deformation 37 of the housing 25 of the apparatus 1. The sensor input signal 39 provides feedback to the controller 4 of the current deformation of the housing 25 of the apparatus 1.

The deformation 37 may comprise any change in size or shape of the housing 25 of the apparatus 1. For example, the deformation 37 may comprise a stretching, bending or twisting of the housing 25 of the apparatus 1. The deformation 37 may be made to the whole of the housing 25 or just a portion of the housing 25 of the apparatus 1.

The sensor input signal 39 which is obtained by the controller 4 from the one or more sensors 19 may provide an indication of the type of the deformation 37 which has been made. For example it may provide an indication of the change of shape of the housing 25. For instance, it may indicate whether the housing 25 has been stretched or bent or twisted or a combination of different deformations.

The sensor input signal 39 which is obtained by the controller 4 from the one or more sensors 19 may also provide an indication of a magnitude of the deformation 37 which has been made. For example it may indicate how far the housing 25 has been stretched or the angle through which the housing 25 has been bent or twisted or the radius of curvature of a bend or twist or any other detectable characteristic which provides an indication of the magnitude of the deformation 37.

In some embodiments of the invention the sensors 19 may also be configured to detect when the housing 25 of the apparatus 1 is not deformed so that the housing 25 is in its equilibrium or rest state. In such embodiments the sensor input signal 39 may indicate that the housing 25 of the apparatus 1 is not deformed.

In response to obtaining the sensor input signal 39 the controller 4 may be configured to compare the current deformation of the housing 25 of the apparatus 1 with the intended deformation of the housing 25 of the apparatus 1 as determined by the initial input signal 31. In response to this comparison the controller 4 may then provide a modified output signal 33 to the actuator 17 to control the further deformations of the housing 25 of the apparatus 1. The modified output signal 33 may be dependent upon both the initial input signal 31 and the obtained sensor input signal 39.

If it is determined that the housing 25 is not yet deformed as determined by the initial input signal 31 then the output signal 33 provided by the controller 4 will cause further movement of the actuator 17 which will then cause further deformation of the housing 25.

In some embodiments the sensor input signal 39 may indicate that the housing 25 has been deformed in accordance with the initial input signal 16. In such cases the output signal 33 which is provided to the one or more actuators 17 may cause the one or more actuators 17 to make no further deformation to the housing 25 of the apparatus 1 and/or to maintain the deformation of the housing 25 of the apparatus 1 in its current state.

In some examplary embodiments of the disclosure different events may cause different initial input signals 31 to be provided to the controller 4 and consequently cause different output signals 16 to be provided by the controller 4. This may enable different types of deformation 37 to be provided in response in response to different events. This may enable the user of the apparatus 1 to determine which event has occurred by determining the type or magnitude of the deformation of the housing 25 of the apparatus 1.

Figure 4:
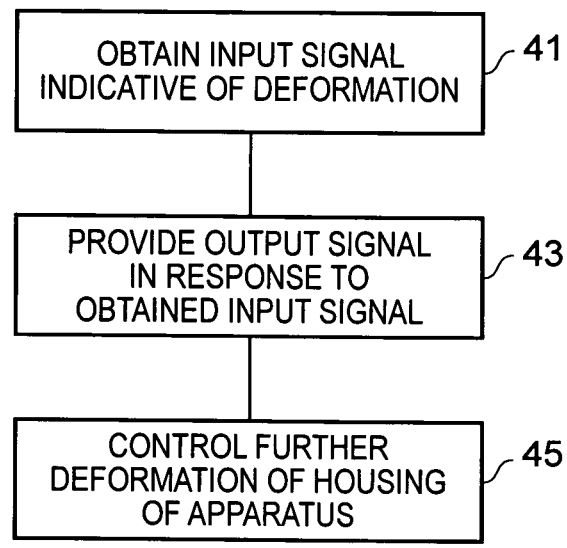
FIG. 4 is a block diagram which schematically illustrates a method according to examplary embodiments of the disclosure.

FIG. 4 is a block diagram which schematically illustrates a method according to examplary embodiments of the disclosure. The apparatus 1 illustrated in FIGS. 1 and 2 may be used to implement the method of FIG. 4.

At block 41 an input signal is obtained. The input signal may be obtained by a controller 4. The input signal may be sensor input signal 39 which may be obtained from one or more sensors 19. The one or more sensors 19 may be configured to detect the deformation of the housing 25 of the apparatus 1 and provide a sensor input signal 39 to the controller 4 as described above in relation to FIGS. 1 to 3. The sensor input signal 39 which is obtained may provide an indication of the deformation of the housing 25 of the apparatus 1.

At block 43, in response to obtaining the input signal, an output signal is provided. The output signal may be provided 43 by the controller 4 to the one or more actuators 17. The output signal which is provided by the controller 4 may be dependent on the sensor input signal 39 which was obtained by the controller 4 from the one or more sensors 19 at block 41.

In some embodiments of the disclosure, as described above in relation to FIG. 3, the output signal which is provided at block 43 may also be dependent upon an initial input signal 31 which is also received by the controller 4. The initial input signal 31 may be received in response to detecting that an event has occurred and may determine the deformation of the apparatus 1 that is to be provided.

At block 45, in response to receiving the provided output signal 33 the actuator 17 controls the further deformation of the housing 25 of the apparatus 1 by moving in accordance with the provided output signal 33.

The blocks illustrated in the FIG. 4 may represent steps in a method and/or sections of code in the computer program 9. The illustration of a particular order to the blocks does not necessarily imply that there is a required or preferred order for the blocks and the order and arrangement of the block may be varied. Furthermore, it may be possible for some blocks to be omitted.

Figure 5A:
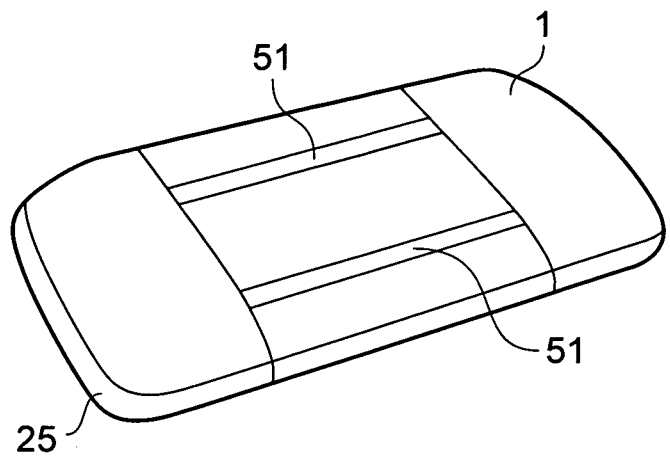
FIGS. 5A and 5B illustrate an apparatus according to an examplary embodiment of the disclosure.
Figure 5B:
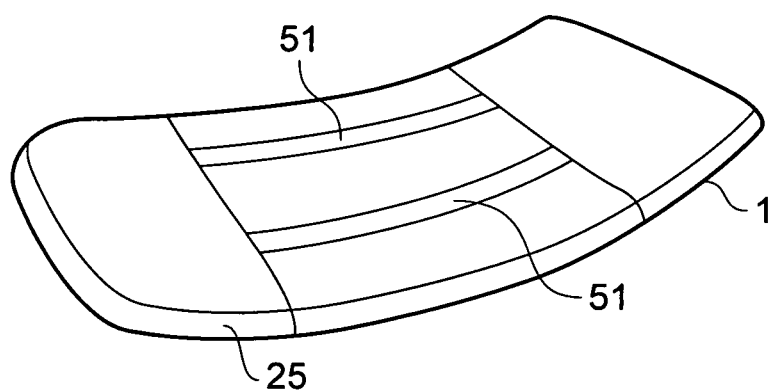

FIGS. 5A and 5B illustrate an apparatus 1 according to an examplary embodiment of the disclosure.

In FIG. 5A the apparatus 1 is configured in an un-deformed state. In the un-deformed state no stress or external force is being applied to the housing 25 of the apparatus 1 by the actuator 17. In the particular embodiment illustrated in FIG. 5A the normal, un-deformed state of the housing of the apparatus 1 comprises a substantially flat rectangular prism. The surfaces of the housing 25 are substantially flat.

In the exemplary embodiment of FIGS. 5A and 5B the one or more actuators 17 are provided on the surface of the housing 25. In the particular embodiment of FIGS. 5A and 5B the actuator 17 may comprise wires 51 comprising a shape memory alloy such as copper-zinc-aluminum-nickel, copper-aluminum-nickel and nickel-titanium. The wires may extend across the surface of the housing 25. The wires 51 are attached to the surface of the housing 25 so that bending of the wires 51 causes bending of the housing 25 of the apparatus 1. Any suitable means may be used to attach the wires 51 to the surface of the housing 25, for example, the wires 51 may be adhered to the surface of the housing 25 using an adhesive.

It is to be appreciated that in other embodiments of the disclosure other types of actuator 17 may be used. For example, in other embodiments of the disclosure one or more of the actuators 17 may be provided within the housing 25 so that they cannot be viewed when the apparatus 1 is in use.

FIG. 5B illustrates the apparatus 1 when the housing 25 of the apparatus 1 is deformed. In the example illustrated in FIG. 5B the controller 4 has received the initial input signal 31, as described above, and in response to the initial input signal 31 has provided an output signal 33 to the wires 51.

In the exemplary embodiment of FIG. 5B the output signal 33 has controlled the wires 51 to curve upwards. As the wires 51 are coupled to the housing 25 the movement of the wires 51 causes the housing 25 to curve upwards with the wires 51.

The housing 25 of the apparatus 1 illustrated in FIG. 5B is now curved upwards so that the side of the apparatus 1 comprising the wires is concave. The apparatus 1 may comprise one or more sensors 19. The sensors may be provided within the housing 25 or in any other suitable part of the apparatus 1. The sensors 19 may be configured to detect the deformation of the apparatus 1. In the example of FIG. 5B the sensors 19 may be configured to detect the radius of curvature of the housing 25 of the apparatus 1 once it has been deformed and provide feedback to the controller 4. This enables the deformation of the housing 25 to be controlled.

It is to be appreciated that the deformation illustrated in FIGS. 5A and 5B is examplary and that many other deformations could be made to the housing 25 of the apparatus 1. Also the apparatus 1 may be configured to provide a deformation which varies in time. For example a portion of the housing 25 of the apparatus 1 may be configured to move backwards and forward in response to the control signals, such a deformation may be useful in providing an alert to the user of the apparatus 1.

Embodiments of the disclosure provide an apparatus 1 and method which may be used to control the deformation of a bendable apparatus. The one or more sensors 19 provide feedback to the controller about the current deformation of the housing 25 of the apparatus 1 and this can be used to control the further deformation of the housing 25 of the apparatus 1. This may enable the apparatus 1 to be deformed automatically without any direct input by the user of the apparatus 1 because the controller 4 and sensors 19 may be configured to control the deformation.

This may enable the deformation of the housing 25 of the apparatus 1 to be used to provide information to the user of the apparatus 1. For example different deformations could be associated with occurrence of different events so bending a first portion of the apparatus might act as an indication that a message has been received while bending another portion of the housing 25 of the apparatus 1 may provide an indication that an incoming call has been received. The different deformations which are provided may enable the user of the apparatus 1 to easily distinguish between the different events without having to view the apparatus 1.

In some embodiments of the invention the deformation of the apparatus 1 may be used to provide an alert to the user of the apparatus 1. For example the actuator 17 may cause the repeated movement of a portion of the housing of the apparatus 1 which may be detected by the user of the apparatus 1in a similar manner to a vibration of an apparatus 1.

In some embodiments the deformation of the apparatus 1 may act to protect components of the apparatus 1. For example in some embodiments the apparatus 1 may comprise a display 15 which may be damaged if the apparatus 1 is dropped. In such embodiments the apparatus 1 may comprise accelerometers or other suitable detectors which may be configured to detect when the apparatus 1 has been dropped and provide an initial input signal 31 to the controller 4. The initial input signal 16 may cause the actuators 17 to deform the housing 25 of the apparatus 1 by curling the apparatus 1 so that the display 15 is located on a concave side of the housing 25 of the apparatus 1 and the dropped apparatus 1 cannot land on the display 15.

In some embodiments of the disclosure the one or more sensors 19 may provide feedback to the controller 4 which prevents the deformation of the housing 25 of the apparatus 1 from causing damage to the housing 25 of the apparatus 1. For example, the deformation of the housing 25 is caused by stresses and strains being applied to the housing 25 by the actuators 17. If the stresses or strains exceed a threshold then this may cause failure of the housing 25 of the apparatus 1 and cause permanent damage to the housing 25. The sensors 19 and controller 4 may be configured to prevent excessive forces being applied to the housing 25 and so protecting the housing 25 from permanent damage.

It is to be appreciated that use of feedback from sensors provides a sensitive apparatus 1 which may be used to provide a range of different types of deformation of the housing of the apparatus and so may have a range of other applications which have not been described above.

Although embodiments of the present invention have been described in the preceding paragraphs with reference to various examples, it should be appreciated that modifications to the examples given can be made without departing from the scope of the invention as claimed. For example in the above described embodiments the initial input signal 31 is described as comprising information which is indicative of a deformation of the housing of the apparatus 1. In other embodiments of the disclosure the initial input signal 31 may comprise information indicative of the event which has been detected. The controller 4 may then use this information to determine the deformation of the housing 25 of the apparatus 1. For example, the controller 4 may access a lookup table to determine which deformation should be associated with the detected event.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   at least one processor; and
   at least one memory including computer program code, wherein the at least one memory and the computer program code are configured, with the at least one processor, to enable the apparatus to:
   obtain an input signal indicative of a particular deformation to be provided to a housing of the apparatus in response to a determination of a force applied to the apparatus exceeding a threshold value; and
   provide, in response to the obtained input signal, an output signal to control a deformation to the housing of the apparatus to the particular deformation indicated by the obtained input signal and control deformation to prevent excessive forces being applied to the housing of the apparatus.

2. The apparatus as claimed in claim 1, wherein the housing comprises an external casing of the apparatus.

3. The apparatus as claimed in claim 1, wherein the housing contains the at least one processor and the at least one memory.

4. The apparatus as claimed in claim 1, wherein a signal indicative of the deformation of the housing of the apparatus is obtained from one or more sensors configured to detect the deformation of the housing.

5. The apparatus as claimed in claim 1, wherein the at least one memory and the computer program code are further configured, with the at least one processor, to receive an input signal indicative of the occurrence of an event, and, in response to the input signal, to provide an output signal causing the housing of the apparatus to be deformed.

6. The apparatus as claimed in claim 1, wherein the apparatus further comprises an actuator configured to receive a control signal from the at least one processor and to control the deformation of the housing of the apparatus in response to the control signal.

7. The apparatus as claimed in claim 1, wherein the deformation comprises at least one of bending, stretching, shrinking, twisting or changing the shape of at least a portion of the housing of the apparatus.

8. The apparatus as claimed in claim 1, wherein the deformation varies in time in a sequence.

9. A method to detect a deformation to a housing of an apparatus, comprising:
   using a programmed processor to:
   obtain an input signal indicative of a particular deformation to be provided to a housing of the apparatus in response to a determination of a force applied to the apparatus exceeding a threshold value; and
   provide, in response to the obtained input signal, an output signal to control a deformation to the housing of the apparatus to the particular deformation indicated by the obtained input signal and control deformation to prevent excessive forces being applied to the housing of the apparatus.

10. The method as claimed in claim 9, wherein the housing comprises an external casing of the apparatus.

11. The method as claimed in claim 9, wherein the housing contains at least one processor and at least one memory configured to enable the method to be carried out.

12. The method as claimed in claim 9, wherein a signal indicative of the deformation of the housing of the apparatus is obtained from one or more sensors configured to detect the deformation of the housing.

13. The method as claimed in claim 9, further comprising:
   receiving an input signal indicative of the occurrence of an event, and, in response to the input signal, providing an output signal causing the housing of the apparatus to be deformed.

14. The method as claimed in claim 9, wherein a control signal to control the deformation of the housing of the apparatus is provided to an actuator configured to control the deformation of the housing of the apparatus in response to the control signal.

15. The method as claimed in claim 9, wherein the deformation comprises at least one of bending, stretching, shrinking, twisting or changing the shape of at least a portion of the housing of the apparatus.

16. A physical entity embodying a computer program comprising program instructions for causing a computer to perform the method of claim 9.

17. The method as claimed in claim 9, wherein the deformation varies in time in a sequence.

18. A non-transitory physical entity embodying a computer program comprising computer program instructions that, when executed by at least one processor, enable an apparatus at least to perform:
  obtaining an input signal indicative of a particular deformation to be provided to a housing of the apparatus in response to a determination of a force applied to the apparatus exceeding a threshold value; and
  providing, in response to the obtained input signal, an output signal to control a deformation to the housing of the apparatus to the particular deformation indicated by the obtained input signal and control deformation to prevent excessive forces being applied to the housing of the apparatus.

* * * * *